United States Patent
Chae et al.

(10) Patent No.: US 12,522,282 B2
(45) Date of Patent: Jan. 13, 2026

(54) STEERING CONTROL APPARATUS OF SBW SYSTEM AND RWA COMPLIANCE MONITORING METHOD THEREOF

(71) Applicant: HL MANDO CORPORATION, Gyeonggi-do (KR)

(72) Inventors: Hansang Chae, Gyeonggi-do (KR); Jaewoo Lee, Gyeonggi-do (KR); Sunggun Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 129 days.

(21) Appl. No.: 18/607,464

(22) Filed: Mar. 16, 2024

(65) Prior Publication Data
US 2025/0242859 A1  Jul. 31, 2025

(30) Foreign Application Priority Data
Jan. 26, 2024 (KR) .................. 10-2024-0012197

(51) Int. Cl.
B62D 5/04 (2006.01)

(52) U.S. Cl.
CPC ......... B62D 5/0481 (2013.01); B62D 5/0409 (2013.01); B62D 5/0412 (2013.01); B62D 5/0487 (2013.01)

(58) Field of Classification Search
CPC .. B62D 5/0409; B62D 5/0412; B62D 5/0481; B62D 5/0487
USPC ...................................................... 701/41–43
See application file for complete search history.

(56) References Cited

U.S. PATENT DOCUMENTS

| | | | |
|---|---|---|---|
| 2020/0307688 A1* | 10/2020 | Higashi | B62D 6/10 |
| 2020/0377148 A1* | 12/2020 | Nakade | B62D 15/025 |
| 2020/0398889 A1* | 12/2020 | Higashi | B62D 3/126 |
| 2022/0048563 A1* | 2/2022 | Schäfer | B62D 5/0481 |
| 2024/0262417 A1* | 8/2024 | Tang | B62D 6/008 |

* cited by examiner

Primary Examiner — Erick R Solis
(74) Attorney, Agent, or Firm — WOMBLE BOND DICKINSON (US) LLP

(57) ABSTRACT

Provided is a steering control apparatus of a Steer by Wire (SbW) system including a Steer wheel Feedback Actuator (SFA) and a Road Wheel Actuator (RWA), the steering control apparatus including: a receiver configured to receive a first angle value from a first sensor provided on a pinion of the RWA, and a second angle value from a second sensor provided on a motor of the RWA; and a controller configured to estimate rack force based on the second angle value, and monitoring compliance of the RWA by using the first angle value and the second angle value based on the rack force.

20 Claims, 9 Drawing Sheets

RECEIVE FIRST ANGLE VALUE FROM FIRST SENSOR PROVIDED ON PINION OF RWA, AND RECEIVE SECOND ANGLE VALUE FROM SECOND SENSOR PROVIDED ON MOTOR OF RWA — S400

ESTIMATE RACK FORCE BASED ON SECOND ANGLE VALUE — S410

MONITOR RWA COMPLIANCE BY USING FIRST ANGLE VALUE AND SECOND ANGLE VALUE BASED ON RACK FORCE — S420

STEERING CONTROL APPARATUS OF SBW SYSTEM AND RWA COMPLIANCE MONITORING METHOD THEREOF

CROSS-REFERENCE TO RELATED APPLICATIONS

This application claims priority under 35 U.S.C. § 119 to Korean Patent Application No. 10-2024-0012197, filed on Jan. 26, 2024, in the Korean Intellectual Property Office (KIPO), the disclosure of which is incorporated by reference herein in its entirety.

TECHNICAL FIELD

The present disclosure relates to a steering control apparatus of a vehicle with a Steer by Wire (SbW) system and a method of monitoring compliance of a Road Wheel Actuator (RWA) by the steering control apparatus.

BACKGROUND

In a general vehicle, the initial performance of the hardware is used to establish the durability and reliability of the system. However, the durability of a vehicle may vary greatly depending on the driver's driving habits, the condition of the vehicle, and the like, and continue to degrade over time.

In vehicles with a universal steering system, such as an Electric Power Steering (EPS) system, the steering wheel and the road wheel are mechanically connected, so any abnormality in the mechanical part of the vehicle may be easily detected by the driver. However, unlike the EPS system, in the SbW system, the steer wheel feedback actuator (SFA) and the RWA are not mechanically connected, but are connected by wire. Therefore, it is difficult for the driver to feel the abnormality of the RWA mechanism part in a vehicle with an SbW system compared to a vehicle with an EPS system. As a result, the driver of a vehicle with an SbW system may not recognize a malfunction until the vehicle has experienced a serious malfunction. Therefore, there is a need for a method to monitor the compliance of the RWA mechanism part in the vehicle with the SbW system at all times.

SUMMARY

The present disclosure has been made in an effort to provide a steering control apparatus and a method of monitoring Road Wheel Actuator (RWA) compliance thereof that are capable of monitoring compliance of the RWA mechanism part at all times in a vehicle with a Steer by Wire (SbW) system.

The present disclosure has also been made in an effort to provide a steering control apparatus and a method of monitoring RWA compliance thereof that are capable proactively notifying a driver of a compliance fault of an RWA mechanism part in a vehicle with an SbW system before the driver becomes aware of the compliance fault.

Technical objects to be achieved by the present disclosure are not limited to those described above, and other technical objects not mentioned above may also be clearly understood from the descriptions given below by those skilled in the art to which the present disclosure belongs.

An exemplary embodiment of the present disclosure provides a steering control apparatus of a Steer by Wire (SbW) system including a Steer wheel Feedback Actuator (SFA) and a Road Wheel Actuator (RWA), the steering control apparatus including: a receiver configured to receive a first angle value from a first sensor provided on a pinion of the RWA, and a second angle value from a second sensor provided on a motor of the RWA; and a controller configured to estimate rack force based on the second angle value, and monitoring compliance of the RWA by using the first angle value and the second angle value based on the rack force.

Herein, the controller may derive first compliance by calculating a difference value between the first angle value and the second angle value based on that a value of the rack force is positive, and derive second compliance by calculating a difference value between the first angle value and the second angle value based on that a value of the rack force is negative.

In this case, the controller may generate a signal representing that a compliance fault is detected, based on that a total value of the first compliance and the second compliance is greater than a threshold value.

Further, the controller may compare, based on that a first rack force value estimated at a first time point is within a reference range, the first rack force value with a second rack force value estimated at a second time point after the first time point.

Further, the controller may determine, based on that the second rack force value is greater than the first rack force value, whether a rack drive speed is lower than a first threshold speed.

Further, the controller may determine, based on that the rack drive speed is lower than the first threshold speed, whether a speed of a vehicle equipped with the SbW system is lower than a second threshold speed.

Further, the controller may determine, based on that the speed of the vehicle is lower than the second threshold speed, whether a rack position is located within a threshold range, and update, based on that the rack position is located within the threshold range, at least one of the first compliance and the second compliance based on a value of the rack force.

Herein, the controller may store, based on that the value of the rack force is zero, a current rack position as a reference position for the threshold range.

Another exemplary embodiment of the present disclosure provides a method of monitoring compliance of a Road Wheel Actuator (RWA) by a steering control apparatus of a Steer by Wire (SbW) system including a Steer wheel Feedback Actuator (SFA) and an RWA, the method including: receiving a first angle value from a first sensor provided on a pinion of the RWA, and a second angle value from a second sensor provided on a motor of the RWA; estimating rack force based on the second angle value; and monitoring compliance of the RWA by using the first angle value and the second angle value based on the rack force.

Still another exemplary embodiment of the present disclosure provides a computer program stored in a computer-readable recording medium, the computer program comprising commands to cause a processor to perform a Road Wheel Actuator (RWA) compliance monitoring method when being executed by the processor, the RWA compliance monitoring method including: estimating rack force based on an angle value of a motor provided on the RWA of a Steer by Wire (SbW) system; and based on the rack force, monitoring compliance of the RWA by using an angle value of a pinion provided in the RWA and an angle value of the motor.

According to the exemplary embodiment of the present disclosure, the steering control apparatus of a vehicle with an SbW system may monitor the compliance of the RWA mechanism part at all times.

According to the exemplary embodiment of the invention, RWA compliance fault may be detected and notified before the driver is aware of the RWA compliance fault, thereby preventing accidents caused by vehicle defects.

DETAILED DESCRIPTION

Figure 1:
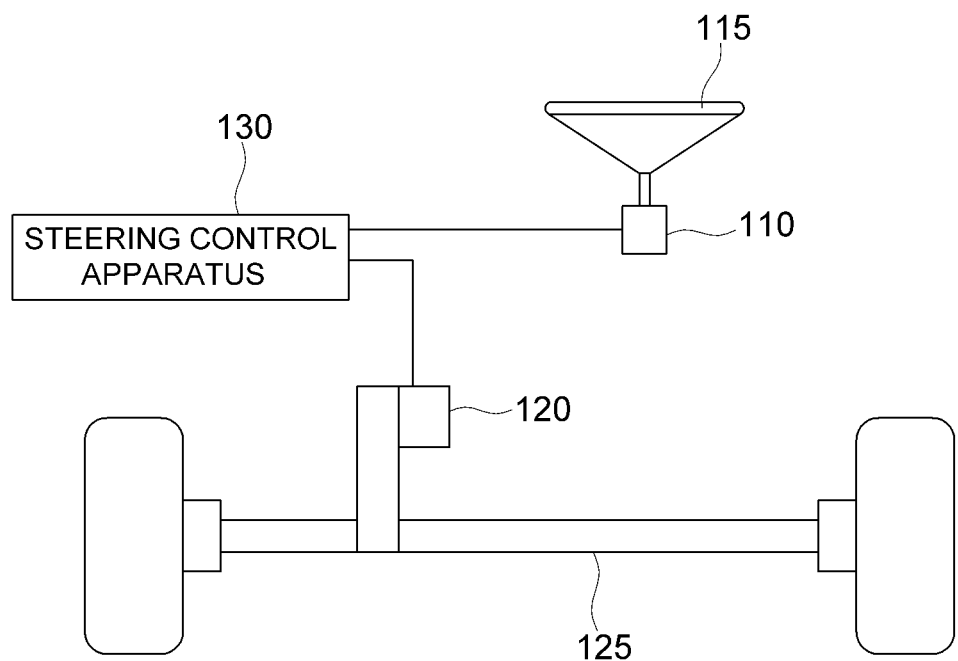
FIG. 1 is a diagram illustrating a Steer by Wire (SbW) system according to an exemplary embodiment of the present disclosure.

The advantages and features of the present disclosure, and a method for achieving them will be clearly understood with reference to the exemplary embodiments described in detail together with appended drawings. However, the present disclosure is not limited to the exemplary embodiments disclosed below but may be implemented in various other forms; rather, the present exemplary embodiments are provided to make the present disclosure complete and inform those skilled in the art clearly of the technical scope of the present disclosure, and the present disclosure may be defined within the technical scope of the appended claims. Thus, in some exemplary embodiments, well-known processing steps, structures, and techniques have not been described in detail to avoid obscuring the interpretation of the present disclosure.

The terms used in the present disclosure have been selected from commonly used and widely accepted terms that best describe the functions of the present disclosure; however, it should be noted that the selection of terms may vary depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them.

In this specification, components of a steering control apparatus may refer to software or hardware components such as a field programmable gate array (FPGA) or an application specific integrated circuit (ASIC), and perform at least one function or operation. However, the above components are not limited to software or hardware. The components may be configured to be in an addressable storage medium and to run one or more processors. Therefore, as an example, the components may include components such as software components, object-oriented software components, class components and task components, processes, functions, properties, procedures, subroutines, segments of program code, drivers, firmware, microcode, circuits, data, databases, data structures, tables, arrays, and variables. The functions provided by the components of the present disclosure may be combined into a smaller number of components or may be further separated into additional components.

Also, the terms such as first, second, and third are introduced to describe various constituting elements, but the constituting elements should not be limited by the terms. The terms are used only for the purpose of distinguishing one from the other constituting elements.

In what follows, exemplary embodiments of the present disclosure will be described in detail with reference to appended drawings so that those skilled in the art to which the present disclosure belongs may readily apply the present disclosure. Moreover, to describe the present disclosure without ambiguity, those parts not related to the description of the present disclosure have been omitted. Throughout the document, the same reference symbols refer to the same constituting elements.

FIG. 1 is a diagram illustrating a Steer by Wire (SbW) system according to an exemplary embodiment of the present disclosure.

Referring to FIG. 1, the SbW system may include a Steer wheel Feedback Actuator (SFA) 110, a Road Wheel Actuator (RWA) 120, and a steering control apparatus 130.

The SFA 110 may be configured to generate reaction force in a direction opposite to the rotation of the steering wheel 115. To this end, in one example, a mechanical part including the SFA 110 (hereinafter referred to as the SFA mechanical part) may be equipped with an electric motor. The electric motor may be referred to as a reaction force motor. A torque generated by the electric motor may be provided or applied to the steering wheel 115 via a torsion bar provided on a steering shaft. One side of the steering shaft may be equipped with a sensor for measuring a torque applied to the torsion bar. One side of the electric motor may be equipped with a sensor for measuring a rotation angle of the electric motor. The measurement values obtained by each of the sensors may be transmitted to the steering control apparatus 130 via a Controller Area Network (CAN) bus.

The RWA 120 may not be mechanically connected to the SFA 110, but may be connected by wire. The RWA 120 may be configured to move the rack 125 to a position corresponding to a steering angle of the steering wheel 115. To this end, a mechanical part including the RWA 120 (hereinafter referred to as the RWA mechanical part) may be provided with a pinion and a drive motor. One side of the pinion may be equipped with a sensor for measuring the position of the rack 125. One side of the drive motor may be equipped with a sensor for measuring the rotation angle, position, torque, and the like of the drive motor. The measurement values obtained by each of the sensors may be transmitted to the steering control apparatus 130.

The steering control apparatus 130 may control the steering of the vehicle to which the SbW system is applied by using the SFA 110 and the RWA 120. In one example, the steering control apparatus 130 may control the driving of the SFA 110 and/or the RWA 120 by using information about the steering angle of the steering wheel 115, the torque applied to the torsion bar, the rack position, and the like. In addition, the steering control apparatus 130 may derive information about rack force, a drive speed of the rack 125, a vehicle speed, and the like based on the measurement values received from the sensors provided on the mechanism part of the RWA 120, and may monitor compliance of the RWA mechanism part based on the derived information.

In the meantime, the steering control apparatus 300 may be implemented as at least one Electronic Control Unit (ECU). While FIG. 1 illustrates one example where a single steering control apparatus 130 controls the SFA 110 and RWA 120, the SbW system may include two or more ECUs as needed. In this case, the SFA 110 and the RWA 120 may each be controlled by different ECUs.

Figure 2:
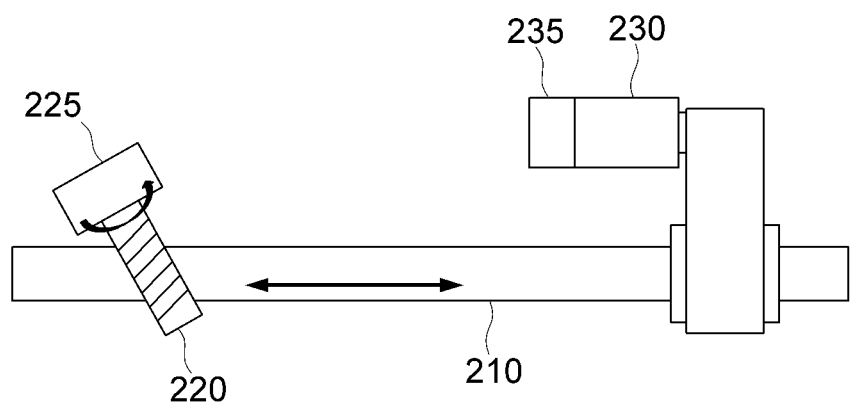
FIG. 2 is a diagram illustrating an RWA mechanism part of the SbW system according to the exemplary embodiment of the present disclosure.

FIG. 2 is a diagram illustrating an RWA mechanism part of the SbW system according to the exemplary embodiment of the present disclosure.

Referring to FIG. 2, the RWA mechanism part may include a rack 210, a pinion 220, a first sensor 225, a drive motor 230, and a second sensor 235.

The rack 210 may be moved in position based on rotation force of the pinion 220 by the RWA. In the following description, the rack 210 may be used interchangeably with terms, such as a rack bar and a rack gear, and the pinion 220 may be used interchangeably with terms, such as a pinion gear.

One side of the pinion 220 may be provided with the first sensor 225 for measuring a current position of the rack 210.

The first sensor 225 may be configured to measure a rotation angle of the pinion 220. The first sensor 225 may be referred to as an Angle Only Sensor (AOS). The angle value measured by the first sensor 225 may be delivered or transmitted to the steering control apparatus via the CAN, and the steering control apparatus may calculate a position of the rack 210 based on the angle value measured by the first sensor 225.

The drive motor 230 is for providing drive force to the road wheels, and one side of the drive motor 230 may be provided with a second sensor 235 for measuring the position of the drive motor 230.

The second sensor 235 may be implemented, for example, as an angle sensor that measures the rotation angle of the drive motor 230. In this case, the position of the drive motor 230 may be derived based on the angle value measured by the second sensor 235. In this regard, the second sensor 235 may be referred to as a Motor Position Sensor (MPS).

Hereinafter, for ease of description, the first sensor 225 provided on the pinion 220 will be referred to as the AOS and the second sensor 235 provided on the drive motor 230 will be referred to as the MPS.

When the steering system consists of a rigid body from the output of the drive motor to the mechanism part that pushes the tire, there may be no difference or a constant difference between the measurement value of the AOS and the measurement value of the MPS. However, there are always differences between the measurement value of the AOS and the measurement value of the MPS due to motor power, external loads, mechanism part separation, and the like. The difference between the measurement value of the AOS and the measurement value of the MPS may be defined as compliance. When the compliance of the RWA exceeds a threshold value, the steering control apparatus may determine that the RWA mechanism part is out of normal.

Figure 3:
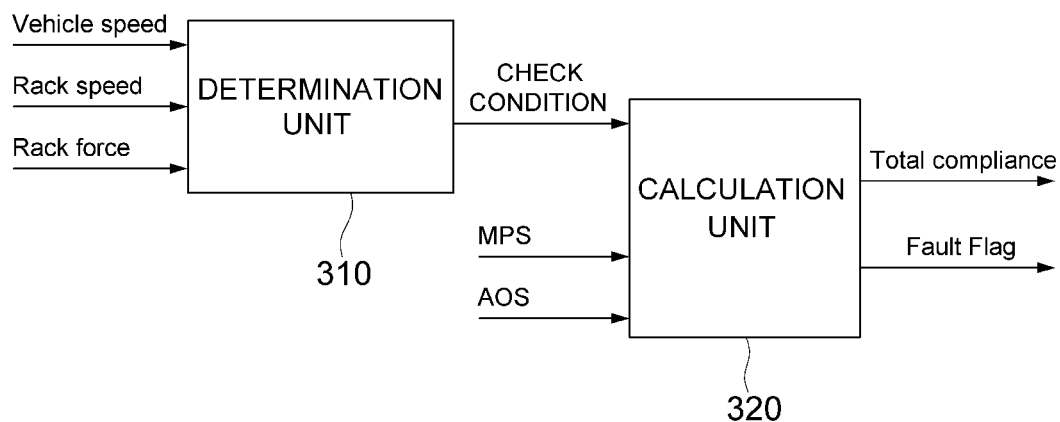
FIG. 3 is a diagram illustrating a steering control apparatus according to an exemplary embodiment of the present disclosure.

FIG. 3 is a diagram illustrating the steering control apparatus according to the exemplary embodiment of the present disclosure.

The steering control apparatus according to the exemplary embodiment of the present disclosure may include a communicator, a memory, and a controller.

The communicator may include a transmitter and a receiver, and may be referred to by various terms, such as a communication interface or a transceiver. The communicator may be configured to communicate with other electronic control units, sensors, and the like in the vehicle via the CAN. For example, the receiver may receive measurement values from the sensors provided in the SFA mechanism part and/or the RWA mechanism part. Further, the transmitter may transmit the control signal (or control commands) generated by the controller to the SFA and/or the RWA.

The memory may store information received via the communicator, and may provide information requested by the controller to the controller. The memory may be implemented in various types of volatile and/or non-volatile memory media, such as a Read Only Memory (ROM) and a Random Access Memory (RAM).

The controller may be implemented as a Micro Controller Unit (MCU) or semiconductor device that executes commands stored in the memory. The controller may include a determination unit 310 and a calculation unit 320 as illustrated in FIG. 3.

The determination unit 310 may determine whether the current state of the vehicle meets an RWA compliance check condition based on information received from the sensors in the vehicle. The RWA compliance check condition may be selected from among conditions that are less affected by disturbances when calculating RWA compliance, such that the value is highly reliable.

In one example, the determination unit 310 may determine whether the current state of the vehicle is a state for checking or calculating RWA compliance based on rack force, a rack speed (or rack drive speed), a speed of the vehicle, or the like.

To this end, the steering control apparatus may calculate a rack position based on an angle value received from an angular sensor (for example, the MPS) provided on the drive motor of the RWA, and differentiate the rack position to calculate a rack acceleration. Further, the steering control apparatus may estimate the rack force by utilizing various information, such as a torque value received from a torque sensor provided on the drive motor, a deceleration ratio of a reducer, friction force, and inertial force, along with the rack acceleration. Further, the steering control apparatus may calculate the rack speed based on the information measured by the angle sensor, and may calculate the speed of the vehicle by computing the speed information of the road wheel measured by an external sensor and the information measured by the MPS.

The determination unit 310 may periodically determine whether the rack force estimation value is within a reference range. Here, the reference range may be set to a range within which the RWA mechanism part is not shaken by the rack force, for example, at a level of 10% of the maximum output. If the current value of the rack force does not exist within the reference range, that is, the current rack force estimation value is outside the level of 10% of the maximum output, the determination unit 310 may determine that the current state of the vehicle does not meet the RWA compliance check condition. In this case, the calculation unit 320 may not check or update RWA compliance. That is, the controller of the steering control apparatus may skip the calculation of the RWA compliance when the controller determines that the current state of the vehicle does not meet the RWA compliance check condition.

When the current rack force estimation value is within the reference range, the determination unit 310 may compare a first rack force value estimated at a first time point to a second rack force value estimated at a second time point to determine whether the rack force is increasing. Here, the first time point may refer to the current time point, and the second time point may refer to a time point after the first time point. When the second rack force value estimated at the second time point is greater than the first rack force value estimated at the first time point, the determination unit 310 may determine that the steering of the vehicle and the force applied to the RWA mechanism part are in the same direction. When the second rack force value estimated at the second time point is equal to or less than the first rack force value estimated at the first time point, the determination unit 310 may determine that the current state of the vehicle does not meet the RWA compliance check condition.

In the meantime, the determination unit 310 may determine whether the rack drive speed and the speed of the vehicle are lower than a first threshold speed and a second threshold speed, respectively. When the rack drive speed is equal to or greater than the first threshold speed, RWA compliance may include disturbances caused by steering. Also, when the vehicle speed is equal to or greater than the second threshold speed, RWA compliance may include disturbances caused by road surface conditions. Thus, the steering control apparatus may perform the calculation of RWA compliance only when the rack drive speed and the vehicle speed are low.

Further, the determination unit 310 may determine whether the current rack position is within a threshold range based on the rack position when the current rack force estimation value is zero. That is, the controller of the steering control apparatus may set the current rack position as a reference position for determining a rack stroke range when the current rack force estimation value is zero. A threshold range for the rack stroke may be set based on the reference position. The determination unit 310 may determine that the current state of the vehicle meets the RWA compliance check condition when the current rack position is within the threshold range.

The calculation unit 320 may update at least one of first compliance and second compliance based on the current value of the rack force when the current state of the vehicle meets the RWA compliance check condition. Here, the first compliance may refer to compliance when the vehicle is driven in a leftward direction, and the second compliance may refer to compliance when the vehicle is driven in a rightward direction.

In one example, the calculation unit 320 may calculate a difference value between the MPS and the AOS, and when the current value of the rack force is positive, the calculation unit 320 may derive or update the difference value to the first compliance value. When the current value of the rack force is negative, the calculation unit 320 may derive or update the difference between the MPS and the AOS to the second compliance value. The calculation part 320 may then compare a total compliance value of the first compliance and the second compliance to a threshold value, and may generate a signal (fault flag) representing whether a compliance fault is detected based on the result.

Figure 4:
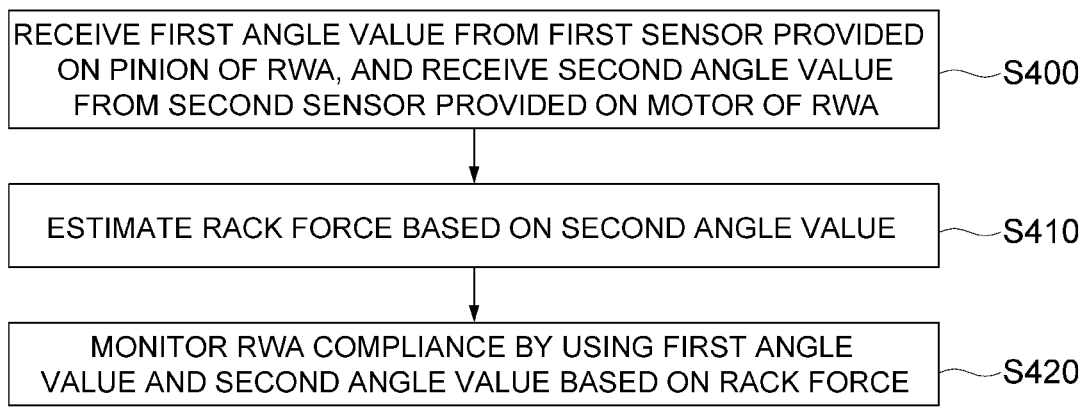
FIG. 4 is a diagram illustrating a method of monitoring Road Wheel Actuator (RWA) compliance by the steering control apparatus according to the exemplary embodiment of the present disclosure.

FIG. 4 is a diagram illustrating a method of monitoring RWA compliance by the steering control apparatus according to the exemplary embodiment of the present disclosure.

Referring to FIG. 4, the steering control apparatus according to the exemplary embodiment of the present disclosure may receive a first angle value from the first sensor provided on a pinion of the RWA in the SbW system, and receive a second angle value from the second sensor provided on the motor of the RWA (S400). Here, the first sensor may include an AOS, and the second sensor may include an MPS. In this case, the first angle value may be represent an angle of the pinion, and the second angle value may be represent a rotation angle of the motor (drive motor).

The steering control apparatus may estimate rack force based on the second angle value measured by the second sensor (S410). For example, the steering control apparatus may estimate the rack force by using a deceleration ratio, friction force, inertial force, or the like based on the measurement values of the angle sensor (or the position sensor) and the torque sensor provided in the drive motor of the RWA mechanism part. Further, the steering control apparatus may monitor RWA compliance by using the first angle value and the second angle value based on the rack force (S420).

In one example, the steering control apparatus may derive a difference value between the first angle value and the second angle value as first compliance when the current state of the vehicle corresponds to a condition for checking RWA compliance, and the value of the rack force is positive. However, when the value of the rack force is negative, the steering control apparatus may derive the difference value between the first angle value and the second angle value as second compliance. The steering control apparatus may then compare a total compliance value (RWA compliance) of the first compliance and the second compliance with a threshold value. When the RWA compliance is greater than the threshold value, the steering control apparatus may output a signal representing that an RWA compliance fault is detected. However, when the RWA compliance is equal to or less than the threshold value, the steering control apparatus may output a signal representing that the RWA compliance is normal.

Figure 5:
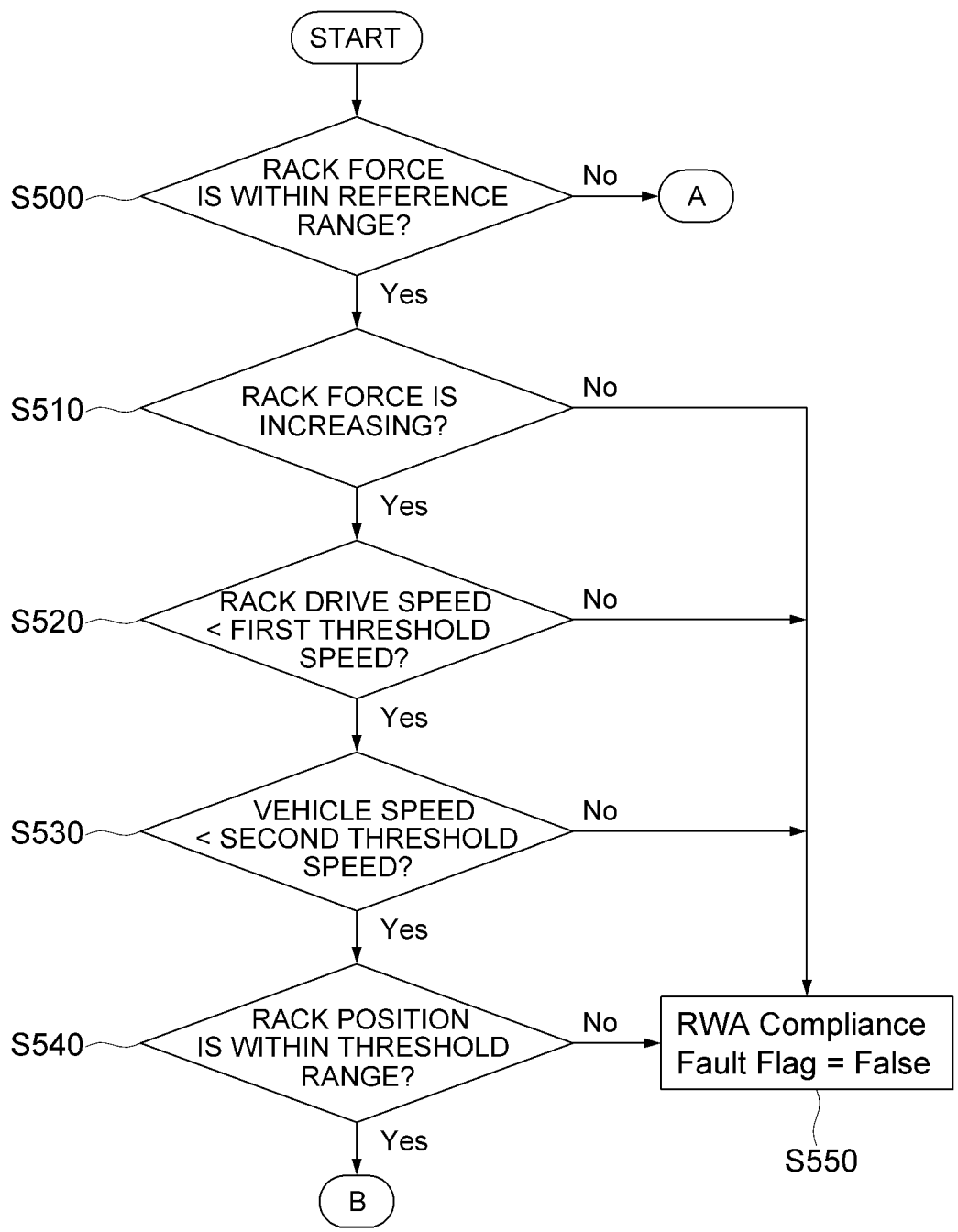
FIG. 5 is a diagram illustrating a process of determining, by the steering control apparatus, an RWA compliance check condition according to the exemplary embodiment of the present disclosure.

FIG. 5 is a diagram illustrating a process of determining, by the steering control apparatus, the RWA compliance check condition according to the exemplary embodiment of the present disclosure.

Hereinafter, a process in which the steering control apparatus according to the exemplary embodiment of the present disclosure determines whether the current state of the vehicle meets a condition for checking RWA compliance will be described in more detail with reference to FIG. 5.

Referring to FIG. 5, in one example, the steering control apparatus may first determine that a first rack force value estimated at the first time point is within a reference range to determine whether the current state of the vehicle meets a condition for checking RWA compliance (S500). When the first rack force value is within the reference range, the steering control apparatus may compare the second rack force value estimated at the second time point with the first rack force value estimated at the first time point to determine whether the rack force is increasing (S510).

When the second rack force value is greater than the first rack force value, the steering control apparatus may determine whether the current rack drive speed is lower than a first threshold speed (S520), and when the rack drive speed is lower than the first threshold speed, the steering control apparatus may determine whether the current speed of the vehicle is lower than a second threshold speed (S530).

Further, the steering control apparatus may determine whether the current rack position is within a threshold range (a preset rack stroke range) when the speed of the vehicle is lower than the second threshold speed (S540). Here, the threshold range may be set based on the rack position (reference position) when the rack force is zero.

The steering control apparatus may determine that the current state of the vehicle corresponds to a condition for checking RWA compliance when the rack force increases within the threshold range, while the rack drive speed and the speed of the vehicle are low, and the current rack position is located within the threshold range (for example, within a range of 1 mm error from the reference position).

In one example, FIG. 5 illustrates the case in which the steering control apparatus determines a condition for rack force, and then sequentially determines a condition for a rack drive speed, a vehicle speed, and a rack position, but there is no limit to the order in which each condition is determined, and the condition for rack drive speed or vehicle speed may be determined first before the condition for rack force is determined, or the condition for rack position may be determined first, as needed.

When any of the conditions described above are not met, the steering control apparatus may determine that the current state of the vehicle does not meet the condition for checking RWA compliance. In this case, the signal representing a fault in RWA compliance (RWA Compliance Fault Flag) may have a value of 0 (False), and the calculation of RWA compliance may be omitted. When the RWA Compliance Fault Flag has a value of 1 (True), this may represent that an RWA compliance fault is detected.

Figure 6:
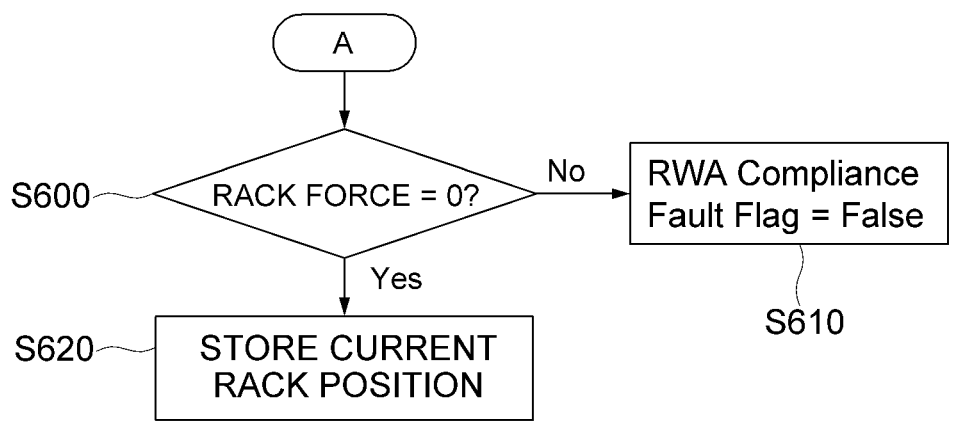
FIG. 6 is a diagram illustrating a process of setting, by the steering control apparatus, a rack position for determining a stroke range according to the exemplary embodiment of the present disclosure.

FIG. 6 is a diagram illustrating a process of setting, by the steering control apparatus, a rack position for determining a stroke range according to the exemplary embodiment of the present disclosure.

Referring to FIG. 6, the steering control apparatus according to the exemplary embodiment of the present disclosure may determine whether the current rack force has a value of zero in determining whether the current state of the vehicle meets the condition for checking RWA compliance (S600). When the current rack force value is not zero, the steering control apparatus may set the value of the RWA Compliance Fault Flag to zero (False) (S610). However, when the current rack force is zero, the steering control apparatus may store the current rack position (S620) and set the current rack position as a reference position for determining the rack stroke range.

Figure 7:
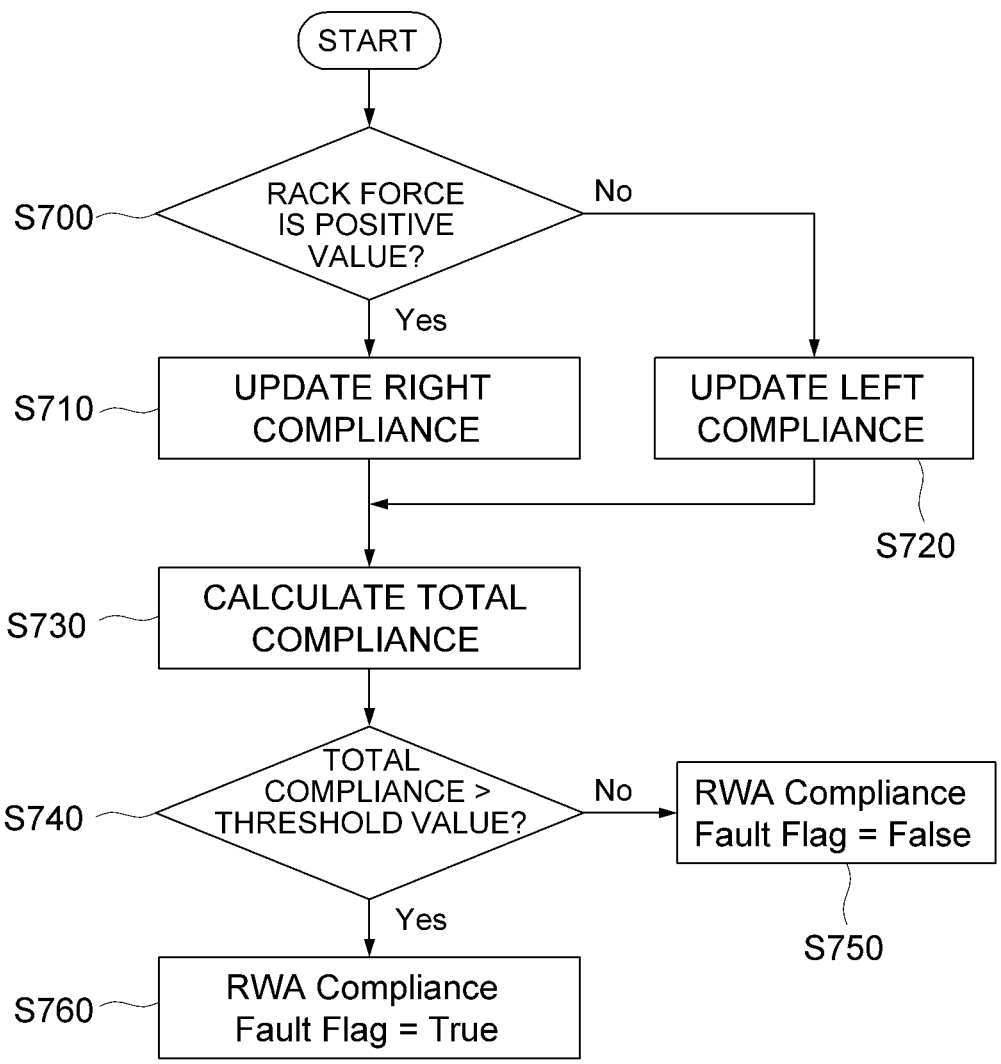
FIG. 7 is a diagram illustrating a process of determining, by the steering control apparatus, whether RWA compliance is faulty according to the exemplary embodiment of the present disclosure.

FIG. 7 is a diagram illustrating a process of determining, by the steering control apparatus, whether RWA compliance is faulty according to the exemplary embodiment of the present disclosure.

The steering control apparatus according to the exemplary embodiment of the present disclosure may perform the RWA compliance calculation process (or RWA compliance update process) illustrated in FIG. 7 when the RWA compliance check condition of FIG. 5 is met.

Referring to FIG. 7, the steering control apparatus may, for example, determine whether the current estimated rack force value is positive (S700). When the rack force value is positive, the steering control apparatus may update the difference value between the measurement value of the MPS and the measurement value of the AOS as compliance for steering in the right direction (Right Compliance) (S710). When the rack force value is negative, the steering control apparatus may update the difference value between the measurement value of the MPS and the measurement value of the AOS as compliance for steering in the left direction (Left Compliance) (S720).

The steering control apparatus may calculate or derive the RWA compliance (Total Compliance) by adding the two compliance (Right Compliance and Left Compliance) (S730), and may compare the calculated total compliance to a threshold value (S740).

When the RWA compliance is equal to or less than the threshold value, the steering control apparatus may output a signal (RWA Compliance Fault Flag=False) representing that a compliance fault is not detected (S750). However, when the RWA compliance has a value greater than the threshold value, the steering control apparatus may output a signal (RWA Compliance Fault Flag=True) representing that a compliance fault is detected (S760).

Figure 8:
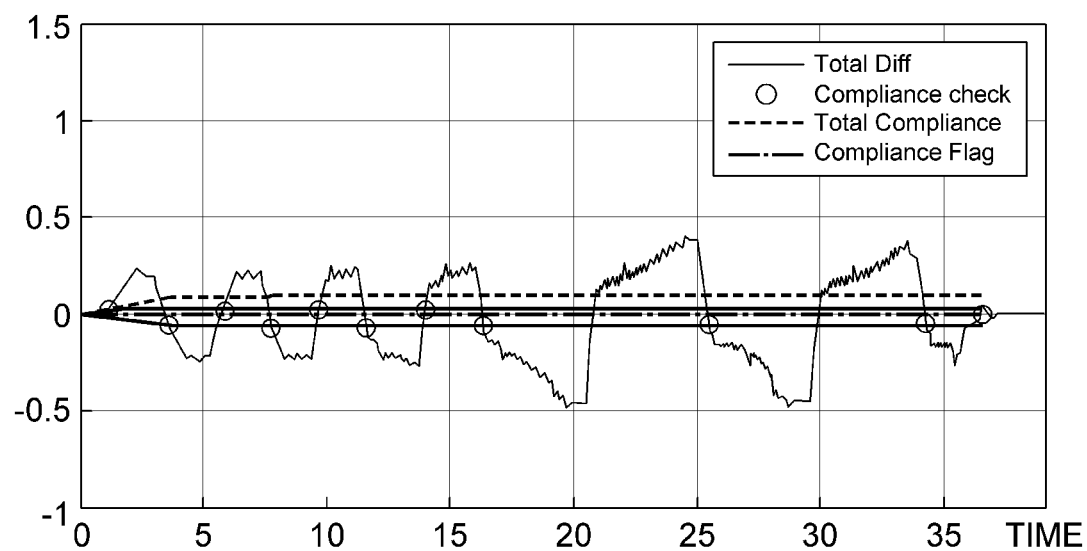
FIG. 8 is a diagram illustrating an example of a case where RWA compliance is normal.
Figure 9:
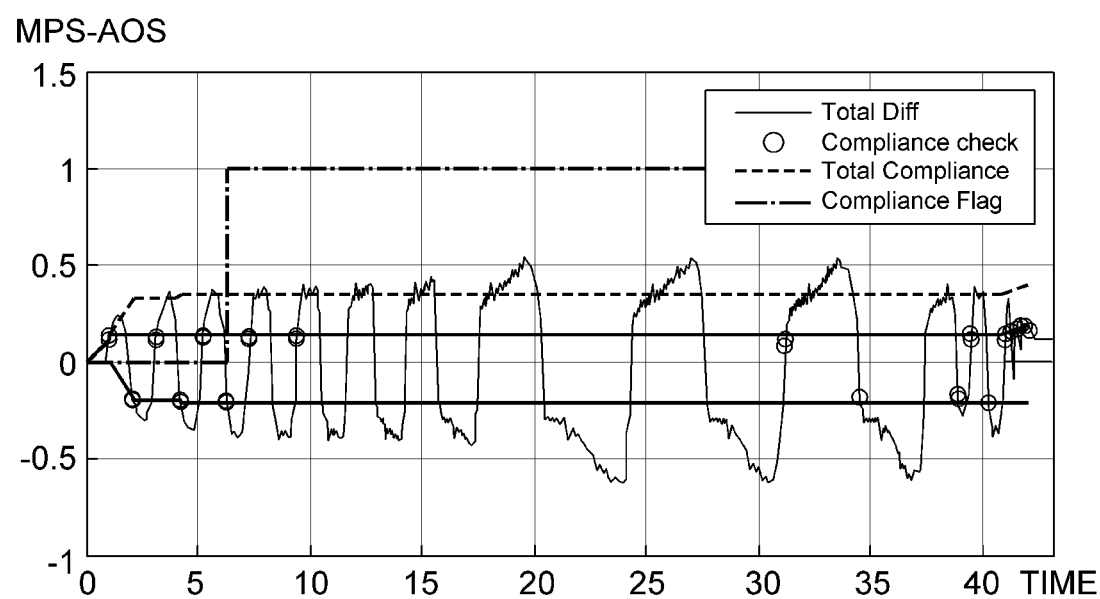
FIG. 9 is a diagram illustrating an example of a case where RWA compliance is faulty.

FIG. 8 is a diagram illustrating an example of a case where RWA compliance is normal, and FIG. 9 is a diagram illustrating an example of a case where RWA compliance is faulty.

The steering control apparatus according to the exemplary embodiment of the present disclosure may update Right Compliance and/or Left Compliance in real time by calculating a difference value between the measurement value of the MPS and the measurement value of the AOS when the state of the vehicle meets the RWA compliance check condition. The steering control apparatus may then add the Right Compliance and Left Compliance to calculate the Total Compliance and compare the Total Compliance to the threshold value. When the Total Compliance value is within a certain level, as illustrated in FIG. 8, the value of the Compliance Flag (RWA Compliance Fault Flag) may be output as zero. However, as illustrated in FIG. 9, when the Total Compliance value exceeds the threshold value, the steering control apparatus may notify the driver that a fault in RWA compliance has occurred by outputting a value of 1 for the Compliance Flag. Thus, according to the present disclosure, because the steering control apparatus monitors RWA compliance at all times, when the performance of the vehicle with the SbW system is degraded, resulting in a fault in RWA compliance, the steering control apparatus may detect the fault before the driver is aware of the fault and notifies the driver of the fault, thereby preventing accidents caused by the fault in RWA compliance.

Further, each of the operations included in the method of monitoring RWA compliance performed by the steering control apparatus according to the foregoing exemplary embodiment may be implemented as a computer program including commands for causing the processor to perform the operation.

Further, each of the operations included in the method of monitoring RWA compliance performed by the steering control apparatus according to the foregoing exemplary embodiment may be implemented in a computer-readable recording medium in which a computer program including commands for causing the processor to perform the operation is recorded.

Meanwhile, the respective operations included in the RWA compliance monitoring method, performed by the steering control apparatus according to the above-described exemplary embodiment, may be implemented as a computer program including instructions for causing a processor to perform the operations.

In addition, each operation included in the RWA compliance monitoring method, performed by the steering control apparatus according to the above-described exemplary embodiment, may be implemented in a computer readable recording medium having a computer program storing instructions thereon, the instructions for causing a processor to perform the operations.

Combinations of individual steps of the appended flow diagrams of the present disclosure may be performed by computer program instructions. Since these computer program instructions may be provided to a processor of a general-purpose computer, a special-purpose computer, or other programmable data processing apparatus, the instructions executed through the processor of the computer or other programmable data processing apparatus generate means for implementing the functions specified in the individual steps of the flow diagrams. Since these computer program instructions may also be stored in a computer-usable or computer-readable memory that may be directed to a computer or other programmable data processing apparatus to implement a function in a particular manner, the instructions stored in the computer-usable or computer-readable memory may produce a manufacturing item including instructions that execute the functions specified in the individual steps of the flow diagrams. Since the computer program instructions may also be loaded onto a computer or other programmable data processing apparatus, by performing a series of operational steps on the computer or other programmable data processing apparatus to generate a process executed by the computer, the instructions operating the computer or other programmable data processing apparatus may also provide steps for executing the functions specified in the respective steps of the flow diagrams.

Also, each step may represent part of a module, segment, or code including one or more executable instructions for executing a specific logical function(s). Also, it is also possible that in some alternative exemplary embodiments, the specified functions are executed out of specified order. For example, it is possible that two steps illustrated one after another may be performed simultaneously, or the steps may be performed in reverse order depending on the corresponding functions.

The above description is merely exemplary description of the technical scope of the present disclosure, and it should be understood by those skilled in the art that various changes and modifications may be made without departing from original characteristics of the present disclosure. Therefore, the exemplary embodiments disclosed in the present disclosure are intended to explain, not to limit, the technical scope of the present disclosure, and the technical scope of the present disclosure is not limited by the exemplary embodiments. The protection scope of the present disclosure should be interpreted based on the following claims, and it should be appreciated that all technical scopes included within a range equivalent thereto are included in the protection scope of the present disclosure.

DETAILED DESCRIPTION OF MAIN ELEMENTS

110: SFA
115: STEERING WHEEL
120: RWA
125: RACK
130: STEERING CONTROL APPARATUS
210: RACK
220: PINION
225: FIRST SENSOR
230: MOTOR
235: SECOND SENSOR
310: DECISION UNIT
320: CALCULATION UNIT

What is claimed is:

1. A steering control apparatus of a Steer by Wire (SbW) system including a Steer wheel Feedback Actuator (SFA) and a Road Wheel Actuator (RWA), the steering control apparatus comprising:
   a receiver configured to receive a first angle value from a first sensor provided on a pinion of the RWA, and a second angle value from a second sensor provided on a motor of the RWA; and
   a controller configured to estimate rack force based on the second angle value, and monitor compliance of the RWA by using the first angle value and the second angle value based on the rack force.

2. The steering control apparatus of claim 1, wherein the controller derives first compliance by calculating a difference value between the first angle value and the second angle value based on that a value of the rack force is positive, and derives second compliance by calculating a difference value between the first angle value and the second angle value based on that a value of the rack force is negative.

3. The steering control apparatus of claim 2, wherein the controller generates a signal representing that a compliance fault is detected, based on that a total value of the first compliance and the second compliance is greater than a threshold value.

4. The steering control apparatus of claim 2, wherein the controller compares, based on that a first rack force value estimated at a first time point is within a reference range, the first rack force value with a second rack force value estimated at a second time point after the first time point.

5. The steering control apparatus of claim 4, wherein the controller determines, based on that the second rack force value is greater than the first rack force value, whether a rack drive speed is lower than a first threshold speed.

6. The steering control apparatus of claim 5, wherein the controller determines, based on that the rack drive speed is lower than the first threshold speed, whether a speed of a vehicle equipped with the SbW system is lower than a second threshold speed.

7. The steering control apparatus of claim 6, wherein the controller determines, based on that the speed of the vehicle is lower than the second threshold speed, whether a rack position is located within a threshold range, and updates, based on that the rack position is located within the threshold range, at least one of the first compliance and the second compliance based on a value of the rack force.

8. The steering control apparatus of claim 6, wherein the controller stores, based on that the value of the rack force is zero, a current rack position as a reference position for the threshold range.

9. A method of monitoring compliance of a Road Wheel Actuator (RWA) by a steering control apparatus of a Steer by Wire (SbW) system including a Steer wheel Feedback Actuator (SFA) and an RWA, the method comprising:
   receiving a first angle value from a first sensor provided on a pinion of the RWA, and a second angle value from a second sensor provided on a motor of the RWA;

estimating rack force based on the second angle value; and monitoring compliance of the RWA by using the first angle value and the second angle value based on the rack force.

10. The method of claim 9, wherein the monitoring includes deriving first compliance by calculating a difference value between the first angle value and the second angle value based on that a value of the rack force is positive, and deriving second compliance by calculating a difference value between the first angle value and the second angle value based on that a value of the rack force is negative.

11. The method of claim 10, further comprising:
after the deriving, generating a signal representing that a compliance fault is detected, based on that a total value of the first compliance and the second compliance is greater than a threshold value.

12. The method of claim 10, further comprising:
before the deriving, determining whether a first rack force value estimated at a first time point is within a reference range; and
comparing, based on that the first rack force value is within the reference range, the first rack force value with a second rack force value estimated at a second time point after the first time point.

13. The method of claim 12, further comprising:
after the comparing, determining, based on that the second rack force value is greater than the first rack force value, whether a rack drive speed is lower than a first threshold speed.

14. The method of claim 13, further comprising:
after the determining, determining, based on that the rack drive speed is lower than the first threshold speed, whether a speed of a vehicle equipped with the SbW system is lower than a second threshold speed.

15. The method of claim 14, further comprising:
after the determining of whether the speed of the vehicle equipped with the SbW system is lower than the second threshold speed,
determining, based on that the speed of the vehicle is lower than the second threshold speed, whether a rack position is located within a threshold range; and
updating, based on that the rack position is located within the threshold range, at least one of the first compliance and the second compliance based on a value of the rack force.

16. The method of claim 15, wherein the threshold range is set based on a rack position when a value of the rack force is zero.

17. A computer program stored in a computer-readable recording medium, the computer program comprising commands to cause a processor to perform a Road Wheel Actuator (RWA) compliance monitoring method when being executed by the processor, the RWA compliance monitoring method comprising:
estimating rack force based on an angle value of a motor provided on the RWA of a Steer by Wire (SbW) system; and
based on the rack force, monitoring compliance of the RWA by using an angle value of a pinion provided in the RWA and an angle value of the motor.

18. The computer program of claim 17, wherein the monitoring includes deriving first compliance by calculating a difference value between the first angle value and the second angle value based on that a value of the rack force is positive, and deriving second compliance by calculating a difference value between the first angle value and the second angle value based on that a value of the rack force is negative.

19. The computer program of claim 18, further comprising:
after the deriving, representing that a compliance fault is detected based on that a total value of the first compliance and the second compliance is greater than a threshold value.

20. The computer program of claim 18, further comprising:
before the deriving,
determining whether a first rack force value estimated at a first time point is within a reference range;
comparing, based on that the first rack force value is within the reference range, the first rack force value with a second rack force value estimated at a second time point after the first time point;
determining, based on that the second rack force value is greater than the first rack force value, whether a rack drive speed is lower than a first threshold speed;
determining, based on that the rack drive speed is lower than the first threshold speed, whether a speed of a vehicle equipped with the SbW system is lower than a second threshold speed;
determining, based on that the speed of the vehicle is lower than the second threshold speed, whether a rack position is located within a threshold range; and
updating, based on that the rack position is located within the threshold range, at least one of the first compliance and the second compliance based on a value of the rack force.

* * * * *